United States Patent
Naito

(10) Patent No.: US 8,198,126 B2
(45) Date of Patent: Jun. 12, 2012

(54) METHOD FOR PRODUCING SOLID ELECTROLYTIC CAPACITOR

(75) Inventor: Kazumi Naito, Chiba (JP)

(73) Assignee: Showa Denko K.K., Tokyo (JP)

( * ) Notice: Subject to any disclaimer, the term of this patent is extended or adjusted under 35 U.S.C. 154(b) by 545 days.

(21) Appl. No.: 11/994,393

(22) PCT Filed: Jun. 30, 2006

(86) PCT No.: PCT/JP2006/313087
§ 371 (c)(1),
(2), (4) Date: Dec. 31, 2007

(87) PCT Pub. No.: WO2007/004553
PCT Pub. Date: Jan. 11, 2007

(65) Prior Publication Data
US 2009/0086412 A1 Apr. 2, 2009

(30) Foreign Application Priority Data
Jun. 30, 2005 (JP) .................................. 2005-191226

(51) Int. Cl.
*H01L 51/40* (2006.01)
(52) U.S. Cl. ........... 438/99; 438/239; 438/381; 438/386; 438/387; 438/393; 257/E21.664; 257/E21.647; 257/E21.648; 257/E21.649
(58) Field of Classification Search ................ 29/25.03; 361/500–599; 438/99, 149, 239, 381–396; 257/E21.647, E21.648, E21.649, E21.664
See application file for complete search history.

(56) References Cited

U.S. PATENT DOCUMENTS

| | | | | |
|---|---|---|---|---|
| 3,254,390 A | * | 6/1966 | Shitasel | 29/25.03 |
| 4,545,883 A | * | 10/1985 | Ovshinsky et al. | 204/192.15 |
| 4,758,929 A | * | 7/1988 | Naitoh et al. | 361/526 |
| 5,005,107 A | * | 4/1991 | Kobashi et al. | 361/540 |
| 5,938,797 A | * | 8/1999 | Fujiwara et al. | 29/25.03 |
| 6,333,844 B1 | * | 12/2001 | Nakamura | 361/523 |
| 6,375,688 B1 | * | 4/2002 | Akami et al. | 29/25.03 |
| 6,430,026 B1 | * | 8/2002 | Nagato et al. | 361/305 |

FOREIGN PATENT DOCUMENTS

| | | |
|---|---|---|
| JP | 5-36267 | 8/1989 |
| JP | 5-36267 Y2 | 9/1993 |
| JP | 05-264499 A | 10/1993 |
| JP | 07-300689 A | 11/1995 |
| JP | 2001-160392 A | 6/2001 |
| JP | 2002-246271 A | 8/2002 |
| JP | 2003-249420 A | 9/2003 |
| JP | 2003249420 A * | 9/2003 |
| JP | 2005-167230 | 6/2005 |
| WO | 2005/048277 A1 | 5/2005 |

OTHER PUBLICATIONS

Official Communication corresponding to Japanese Patent Application No. 2007-524023, dated Dec. 10, 2010.

* cited by examiner

*Primary Examiner* — Charles Garber
*Assistant Examiner* — Abdulfattah Mustapha
(74) *Attorney, Agent, or Firm* — Sughrue Mion, PLLC

(57) ABSTRACT

The invention relates to a method for producing a solid electrolytic capacitor with excellent LC value, comprising sequentially stacking a dielectric oxide film, a semiconductor layer and an electrode layer on a sintered body of conductive powder to which an anode lead is connected and then encapsulating the whole with an outer jacket resin, wherein surface area of a cathode plate used in forming the semiconductor layer on the dielectric oxide film by applying current between the conductor having the dielectric oxide film thereon used as anode and the cathode plate provided in electrolysis solution is made larger by 10 times or more than its apparent surface area to thereby efficiently form the semiconductor layer, a capacitor produced by the method, and electronic circuits and electronic devices using the capacitor.

15 Claims, No Drawings

METHOD FOR PRODUCING SOLID ELECTROLYTIC CAPACITOR

This application is a national stage of PCT application PCT/JP2006/313087 filed on Jun. 30, 2006, claiming priority to Japanese Patent Application No. 2005-191226, filed Jun. 30, 2005 the contents of which are incorporated herein by reference.

TECHNICAL FIELD

The present invention relates to a method of producing solid electrolytic capacitors, comprising sequentially stacking a dielectric oxide film, a semiconductor layer and an electrode layer on a sintered body of conductive powder and then encapsulating the whole with resin. More specifically, the present invention relates to a method of producing solid electrolytic capacitors, which method can efficiently form a good quality semiconductor layer on a dielectric oxide film formed on a sintered body consisting of conductive powder and can produce a solid electrolytic capacitor with excellent leakage current value (LC).

BACKGROUND ART

As one of large-capacitance capacitors used in various electronic devices, a type of solid electrolytic capacitor wherein a solid electrolytic capacitor element having a dielectric oxide film, a semiconductor layer and an electrode layer stacked on a sintered body of conductive powder and the whole is encapsulated with resin.

A solid electrolytic capacitor is fabricated by encapsulating an element consisting of a sintered body of conductive powder such as tantalum having micropores inside it as one electrode (conductor), a dielectric layer formed on the electrode, the other electrode (generally, semiconductor layer) formed on the dielectric layer and another electrode layer formed on the said other electrode. When volumes of conductors are the same, the smaller the size of the micropores and the larger the number of the micropores, the larger the inside surface area of a conductor and therefore, the larger the capacitance of a produced capacitor from the conductor.

Recently, in a solid electrolytic capacitor, low ESR (Equivalent Series Resistance) is required. To meet this, an electroconductive polymer is always employed as an inner semiconductor layer. Such a semiconductor layer is formed by chemical polymerization method or electrolytic polymerization method. As one example, a semiconductor layer is formed by immersing a conductor having a dielectric layer thereon in two solutions separately prepared, alternately, one containing oxidant and dopant and the other containing monomer, except for anode lead of the conductor.

A semiconductor layer is formed by pure chemical reaction without operation of applying current (i.e., solution reaction, vapor phase reaction or combination thereof), by a method involving applying of current or by combination of these methods.

Examples of method involving applying of current include a method where a semiconductor layer is formed on the dielectric layer by applying current to a cathode plate provided in a solution for forming a semiconductor layer, with a conductor or an external electrode being placed in contact with or in the vicinity of the conductor being used as anode. Methods of applying current include constant-voltage approach, constant current approach and combination thereof. For the purpose of stable formation of semiconductor layer in a case where current is applied to multiple conductors simultaneously, constant current approach is preferred.

As cathode plate, a plate of stainless-steel, platinum, tantalum or the like, less corrodible by a liquid in which current is passed is used. For example, as described in Japanese Utility Model Application Laid-Open No. H05-36267 (Patent Document 1), a group of conductors fixed to an anode plate so that the fixed conductors can be prominent like comb teeth is immersed in a bath for forming a semiconductor layer and a cathode plate is provided so that the cathode faces the anode. In this document, metal plates having on the surface a protrusion at each position corresponding to each of the conductors for the purpose of controlling electric fields are used. In conventional techniques including this example, surface area of a cathode metal plate is much smaller that the total surface area of a group of conductors having micropores on the surface.

[Patent Document 1] Japanese Utility Model Application Laid-Open No. H05-36267

DISCLOSURE OF INVENTION

Problems to be Solved by Invention

Accordingly, the object of the present invention is to provide a method of producing solid electrolytic capacitors having excellent LC, comprising a step of efficiently forming a good-quality semiconductor layer on a conductor having a dielectric oxide film on the surface by applying current with the conductor serving as anode.

Means for Solving the Problem

As a result of intensive studies with a view to attaining the above object, the present inventors have found out that the above object can be attained by making the surface area of the cathode plate provided in semiconductor-forming solution as large as the surface area of the conductors, that is, making the surface area of the cathode plate in the semiconductor-forming solution larger by 10 times or more than the projected area of the cathode plate in the process of forming a semiconductor layer on each conductor having a dielectric oxide film on the surface by applying current with the conductors serving as anode, and thus completed the present invention.

That is, the present invention relates to a method of producing solid electrolytic capacitors, a solid electrolytic capacitor produced by the method and uses thereof, as follows.

1. A method of producing solid electrolytic capacitors, comprising sequentially stacking a dielectric oxide film, a semiconductor layer and an electrode layer on a sintered body of conductive powder to which an anode lead is connected and then encapsulating the whole with an outer jacket resin, wherein the cathode plate used in forming the semiconductor layer on the dielectric oxide film by applying current between the conductor having the dielectric oxide film thereon used as an anode and a cathode plate provided in electrolysis solution is a cathode plate with its surface area having been made larger by 10 times or more than its apparent surface area.

2. The method of producing solid electrolytic capacitors according to 1, wherein the wall of the container used to form the semiconductor layer is used as cathode.

3. The method of producing solid electrolytic capacitors according to 1 or 2, wherein by connecting the sintered body of conductive powder to the cathode plate provided in the container used to form the semiconductor layer or to the wall of the container, the surface area of the cathode is made larger by 10 times or more than the apparent surface area of the cathode.

4. The method of producing solid electrolytic capacitors according to 1, wherein the conductor is a metal or alloy consisting mainly of at least one selected from the group consisting of tantalum, niobium, titanium and aluminium, niobium oxide, or a mixture of two or more of these metals, alloys and niobium oxide.

5. The method of producing solid electrolytic capacitors according to 1, wherein the material of the anode lead is tantalum, aluminium, niobium and titanium or an alloy mainly containing these valve-action metals.

6. The method of producing solid electrolytic capacitors according to 1, wherein the anode lead is in form of line, foil or sheet.

7. The method of producing solid electrolytic capacitors according to 1, wherein the semiconductor layer is at least one selected from organic semiconductor layer and inorganic semiconductor layer.

8. The method of producing solid electrolytic capacitors according to 7, wherein the organic semiconductor is at least one selected from the group consisting of an organic semiconductor consisting of benzopyrroline tetramer and chloranile, an organic semiconductor mainly consisting of tetrathiotetracene, an organic semiconductor mainly consisting of tetracyanoquinodimethane and an organic semiconductor mainly consisting of an electroconductive polymer prepared by doping a dopant to a polymer having a repeating unit represented by formula (1) or (2).

[Chem. 1]

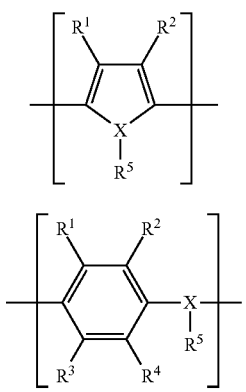

(In the formula, $R^1$ to $R^4$ each independently represents a hydrogen atom, an alkyl group having 1 to 6 carbon atoms or an alkoxy group having 1 to 6 carbon atoms, X represents an oxygen atom, a sulfur atom or a nitrogen atom, $R^5$, which is present only when X is a nitrogen atom, represents a hydrogen atom or an alkyl group having 1 to 6 carbon atoms, and $R^1$ with $R^2$ or $R^3$ with $R^4$ may combine with each other to form a ring.)

9. The method of producing solid electrolytic capacitors according to 8, wherein the electroconductive polymer having the repeating unit represented by formula (1) is an electroconductive polymer having as repeating unit a structural unit represented by formula (3).

[Chem. 2]

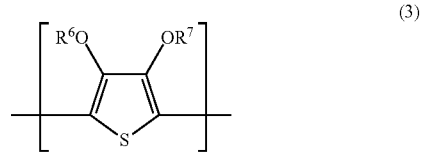

(In the formula, $R^6$ and $R^7$ each independently represents a hydrogen atom, a linear or branched, saturated or unsaturated alkyl group having 1 to 6 carbon atoms, or a substituent forming at least one 5- to 7-membered saturated hydrocarbon ring structure containing two oxygen atoms, in which said alkyl groups are bonded at arbitrary positions with each other. Also, examples of the ring structure include those having a vinylene or phenylene bond which may be substituted.)

10. The method of producing solid electrolytic capacitors according to 8, wherein the electroconductive polymer is selected from polyaniline, polyoxyphenylene, polyphenylene sulfide, polythiophene, polyfuran, polypyrrole, polymethylpyrrole, and substituted derivatives thereof and copolymers thereof.

11. The method of producing solid electrolytic capacitors according to 9 or 10, wherein the electroconductive polymer is poly(3,4-ethylenedioxythiophene).

12. The method of producing solid electrolytic capacitors according to 7, wherein the electroconductivity of the semiconductor is within a range of $10^{-2}$ to $10^3$ S/cm.

13. A solid electrolytic capacitor produced by the method described in any one of 1 to 12.

14. An electronic circuit using the solid electrolytic capacitor described in 13.

15. An electronic device using the solid electrolytic capacitor described in 13.

Effect of Invention

The present invention is to provide a production method of solid electrolytic capacitors, characterized in that, in the production method comprising sequentially stacking a dielectric oxide film, a semiconductor layer and an electrode layer on a sintered body of conductive powder having an anode lead implanted therein and then encapsulating the whole with an outer jacket resin, the cathode plate used in forming the semiconductor layer on the dielectric film by applying current between the conductor having the dielectric film on the surface used as anode and a cathode plate provided in the semiconductor-forming solution to form the semiconductor is a cathode plate with its surface area having been made larger by 10 times or more than its apparent surface area. Here, the term "the apparent surface area" means the area calculated from the outline size of the cathode, which area contacts with the semiconductor-layer forming solution. If the cathode has a flat shape, the area corresponds to its projected area (if the shape is rectangular of length a and width b, the area is calculated from a×b).

According to the present invention, a good-quality semiconductor layer can be efficiently formed on the dielectric oxide film on the sintered body consisting of conductive powder and a solid electrolytic capacitor excellent in LC can be produced.

BEST MODE FOR CARRYING OUT THE INVENTION

Hereinafter, one embodiment of the production method of solid electrolytic capacitors and the solid electrolytic capacitor produced according to the present invention is explained.

The sintered body of the present invention is prepared by sintering a molded body of conductive powder having an anode lead implanted on the surface. The surface area of the sintered body can be increased by appropriately selecting the molding pressure (e.g., from 0.1 to 50 Kg/mm$^2$) and the sintering conditions (e.g., a temperature of 800 to 1800° C. and time of 1 to 10 hours). For the purpose of further increasing the surface area of the sintered body after sintered, the surface of the sintered body may be subjected to chemical/electrical etching treatment.

There is no limitation on the shape of the sintered body. Generally, it has a columnar shape. In case of prismatic shape, at least one of angles may be chamfered or made spherical so that the average leakage current value (LC) of solid electrolytic capacitors produced by using such sintered bodies may be excellent. Also, in order to be released from a molding die, the molded body may have a tapered shape. In such a case, the shape of the prepared sintered body becomes an approximate truncated pyramid.

Examples of the conductor include tantalum, aluminium, niobium, titanium, alloys mainly containing these valve-action metals, niobium oxide and mixtures of two or more of these valve-action metals, alloys and electroconductive oxides.

The valve-action metals, alloys or electroconductive oxides as described above or the sintered body may be used after subjecting a part thereof to at least one treatment selected from carbonization, phosphation, boronation, nitridation, sulfidation and oxidation.

An outgoing lead may be connected directly to the conductor. In a case where a powdery state conductor is molded or molded and then sintered, it is also possible to mold a part of a separately prepared lead wire together with the powdery conductor and use the part of the outgoing lead wire outside the molded portion as an outgoing lead for one electrode of the capacitor.

The anode lead may have either shape of wire, foil and sheet. Also, the anode lead may be connected to the sintered body after sintering, instead of implanting the anode lead in the molded body before sintering. Examples of the material for the anode lead include tantalum, aluminium, niobium, titanium and alloys mainly containing these valve-action metals. Moreover, the anode lead may be used after subjecting a part thereof to at least one treatment selected from carbonization, phosphation, boronation, nitridation, sulfidation and oxidation.

In a case where the anode lead is implanted in the molded body, it is preferable that the implantation depth of the anode lead in the sintered body be one-third or more of the sintered body's length in the implanting direction, more preferably two-thirds or more, in consideration for maintaining strength of the sintered body to endure the thermal and physical pressures at the time of encapsulating the capacitor element which is described later.

In order to prevent the semiconductor layer from attaching to the upper portion of the anode lead which will result in short circuit, insulative resin may be used to cover the boundary region (on the anode side) between the sintered body and the anode lead in a belt-like manner, so that insulation can be ensured. Alternatively, an insulative plate through which the anode lead is allowed to penetrate may be provided.

In the present invention, a dielectric oxide film layer is formed on the sintered body and part of the anode lead. Examples of dielectric oxide film layer include dielectric layers mainly containing at least one of metal oxides such as $Ta_2O_5$, $Al_2O_3$, $TiO_2$ and $Nb_2O_5$. The dielectric layer can be obtained by chemically forming the anode substrate in an electrolysis solution. Alternatively, the layer may be a dielectric layer comprising a mixture of a dielectric layer mainly containing at least one metal oxide and a dielectric layer used in a ceramic capacitor (International Publication No. WO00/75943 pamphlet (U.S. Pat. No. 6,430,026)).

A typical example of the semiconductor layer formed on the dielectric layer in the present invention is at least one kind of compounds selected from organic semiconductors and inorganic semiconductors.

Examples of organic semiconductors include organic semiconductors consisting mainly of an electroconductive polymer prepared by doping a dopnat to a polymer having a repeating unit represented by formula (1) or (2).

[Chem. 3]

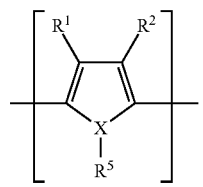

(1)

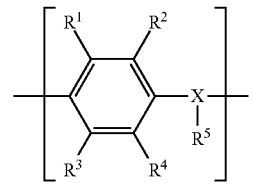

(2)

In formulae (1) and (2), $R^1$ to $R^4$ each independently represents a hydrogen atom, an alkyl group having 1 to 6 carbon atoms or an alkoxy group having 1 to 6 carbon atoms, X represents an oxygen atom, a sulfur atom or a nitrogen atom, $R^5$, which is present only when X is a nitrogen atom, represents a hydrogen atom or an alkyl group having 1 to 6 carbon atoms, and $R^1$ with $R^2$ or $R^3$ with $R^4$ may combine with each other to form a ring.

Further, in the present invention, the electroconductive polymer containing the repeating unit represented by formula (1) is preferably an electroconductive polymer containing as repeating unit a structural unit represented by formula (3).

[Chem. 4]

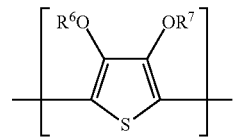

(3)

In the formula, $R^6$ and $R^7$ each independently represents a hydrogen atom, a linear or branched, saturated or unsaturated alkyl group having 1 to 6 carbon atoms, or a substituent forming at least one 5- to 7-membered saturated hydrocarbon ring structure containing two oxygen atoms, in which said alkyl groups are bonded at arbitrary positions with each other. Also, examples of the ring structure include those having a vinylene or phenylene bond which may be substituted.

The electroconductive polymer containing such a chemical structure is charged and doped with a dopant. There is no particular limitation on the dopant and known dopants may be used.

Examples of polymer containing a repeated unit represented by formula (1), (2) or (3) include polyaniline, polyoxyphenylene, polyphenylene sulfide, polythiophene, polyfuran, polypyrrole, polymethylpyrrole, substituted derivatives thereof and copolymers thereof. Preferred among them are polypyrrole, polythiophene and substituted derivatives thereof (such as poly(3,4-ethylenedioxythiophene)).

Examples of inorganic semiconductor include at least one compound selected from molybdenum dioxide, tungsten dioxide, lead dioxide and manganese dioxide.

When the organic or inorganic semiconductor used has an electric conductivity of $10^{-2}$ to $10^3$ S/cm, the solid electrolytic capacitor produced can have a small ESR value and this is preferred.

A semiconductor layer is formed by pure chemical reaction without operation of applying current (i.e., solution reaction, vapor phase reaction or combination thereof), by a method involving applying of current or by combination of these methods. In the present invention, at least one step of applying current is included in the process of forming the semiconductor layer.

The present invention is characterized in that, in the method of forming the semiconductor layer on a dielectric oxide film by applying current between the conductor having the dielectric oxide film on the surface used as anode and the cathode plate provided in the electrolysis solution, the surface area of the cathode is increased by 10 times or more, preferably 30 times or more, from its apparent surface area. The larger the multiplying factor, the more preferable, within an extent that production can be conducted.

One embodiment of the method according to the present invention where semiconductor layers are simultaneously formed on multiple conductors each having a dielectric layer formed on the surface is explained below.

The anode parts of multiple conductors (e.g., 10 to 1000, preferably 10 to 200 conductors) of the same size are connected to a long metal plate at even intervals. Plurality (e.g., 10 to 500, preferably 10 to 200) of thus prepared long metal plates are provided in a metal lead frame. The lead frame is placed on a container so that the part of each conductor on which a semiconductor is formed can be immersed in a separately prepared semiconductor-forming solution in the container. Then, reaction for forming semiconductor layer is carried out for a predetermined period of time in the container. By applying a predetermined amount of constant direct current to a cathode plate provided in the container for forming semiconductor layers from a power feeding terminal provided on the metal frame, a semiconductor layer is formed on the dielectric layer on each of the conductors.

The cathode plate provided in the semiconductor layer-forming solution is used as counter cathode in applying current. As material for the cathode, electroconductive materials, particularly metal foil or metal plate, are employed.

Preferred examples thereof include stainless steel plate, tantalum plate and platinum plate.

In the present invention, the surface area of the cathode plate is increased by 10 times or more of the apparent surface area. Examples of method of increasing the area include a method using a platinum plate having platinum black formed on the surface or a tantalum, niobium or stainless-steel plate having platinum black attached onto the surface. Further, examples thereof include a method where the multiple conductors to form semiconductor layer on the surface and the stainless-steel, tantalum or platinum plate are connected by welding to increase the surface area by the connected portions of the conductors. Preferred among them is the embodiment where the container for forming semiconductor layer is used as cathode and the conductors are connected by welding.

By using a cathode plate having a surface area increased by 10 times or more of the original apparent surface area, the electric current applied thereto can be stable and a good-quality semiconductor can be formed in a shorter period of time than in conventional method. Accordingly, a solid electrolytic capacitor as final product having an excellent LC value can be produced efficiently.

In the present invention, the multiplying factor of the surface area against the apparent surface area is calculated by dividing a value measured by the BET method with the surface area of the original metal material.

An embodiment including an arrangement where the electric current is applied uniformly to all the conductors immersed in the semiconductor layer-forming solution by using two or more cathode plates electrically connected to at least one feeding part is preferred.

By applying a predetermined amount of constant direct current for a predetermined period of time to thereby form semiconductor layers, it is possible that the value obtained by dividing the standard deviation of capacitance values of a group of produced capacitors by the average value of capacitance can be 10% or less, preferably 7% or less, more preferably 5% or less. By applying a predetermined amount of constant current, the amount of current to be applied on each conductor is determined. Even if the amount of current applied to some of the conductors fluctuates for some reason, since the total amount is always constant, the current amount applied to the other conductors changes to offset the fluctuation. As a result, current supply to each conductor can be stable all through the current-applying time. The mass of the semiconductor layer is given by integration value of the total current amount and time if no side-reaction occurs. Therefore, the capacitance of capacitor which has a proportional relationship with the mass of the semiconductor layer can be stable and the standard deviation of capacitance values of a group of produced capacitors can be small.

In the present invention, time for applying current and constant current value to be predetermined, which vary depending on the kind, size and density of the conductor used, the kind and thickness of the dielectric layer formed thereon, the kind of the semiconductor layer formed thereon and the like, are determined by conducting preliminary experiments. As one approach for preliminary experiment, properness of constant current values can be determined by controlling the mass of the semiconductor layer. For example, with each predetermined constant current value, time for applying current and the mass of semiconductor are plotted. In the plotted data, the current value with which the mass of semiconductor having reached saturation is the largest can be employed as the constant current value to be employed.

In the semiconductor layer-forming solution, raw materials for forming semiconductor by applying current, and in some cases, at least one of the above-described dopants (such as known dopants, e.g., aryl sulfonic acid or salt thereof, alkyl sulfonic acid or salt thereof, various polymeric sulfonic acids and salts thereof and known compounds having each of the above described substituents). By passing electric current through the solution, a semiconductor layer is formed on a dielectric layer. The temperature and pH value of the semiconductor layer-forming solution is determined by preliminary experiments conducted to find out conditions appropriate for forming semiconductor layer.

In the present invention, after applying a predetermined constant current, for the purpose of mending minute defects of dielectric layer caused by formation of the semiconductor layer, chemical formation may be conducted again (or in a case where formation of the dielectric layer is not conducted by chemical formation, chemical formation may be conducted for the first time). The operation of applying a predetermined constant current and conducting chemical reformation may be repeated twice or more. Also, the constant current value may be changed in each operation repeated. Generally, when applying the constant current is stopped, the metal frame is pulled up from the container containing the semiconductor layer-forming solution, washed and dried. Then, chemical formation is allowed to be conducted again. Or the step of applying a constant current may be conducted once or more before starting the chemical reformation. Although the reason is not clear, the mass of the semiconductor is increased in a case where current is stopped once or more and then a step of washing and drying step is conducted between the repeated steps of applying current, as compared to a case where current is continuously applied, if the total time for applying current is the same in both of the cases.

Chemical reformation can be conducted in the same manner as in formation of dielectric layer as descried previously. The voltage employed in chemical reformation is generally the voltage value used in (the first) chemical formation or lower.

In the present invention, an electrode layer is formed on the semiconductor layer formed by the above-described method. The electrode layer can be formed, for example, by solidification of an electrically conducting paste, plating, metal deposition or lamination of a heat-resistant electrically conductive resin film. Preferred examples of the electrically conducting paste include silver paste, copper paste, aluminum paste, carbon paste and nickel paste. One of these may be used or two or more thereof may be used. In the case of using two or more pastes, these pastes may be mixed or stacked as separate layers. The electrically conducting paste applied is then left standing in air or heated to thereby be solidified. The thickness of one electroconductive paste layer after solidified is generally about 0.1 to about 200 μm.

Generally, an electroconductive paste contains 40 to 97 mass % of electroconductive powder. If the content is less than 40 mass %, the conductivity of the prepared electroconductive paste is low. If the content exceeds 97 mass %, adhesiveness of the prepared electroconductive past is low. An electroconductive paste in a mixture with electroconductive polymer or metal oxide powder as previously described as usable for forming the semiconductor layer may be used.

Examples of the plating include nickel plating, copper plating, silver plating, gold plating and aluminum plating. Examples of the metal to be deposited include aluminum, nickel, copper, gold and silver.

Specifically, the electrode layer is formed by sequentially stacking, for example, a carbon paste and a silver paste on the conductor having a semiconductor layer formed thereon.

By stacking the layers up to the electrode layer to form a cathode part on the conductor in this way, a solid electrolytic capacitor element is produced.

The solid electrolytic capacitor element of the present invention having such a structure is jacketed, for example, by resin mold, resin case, metallic jacket case, resin dipping or laminate film, whereby a solid electrolytic capacitor product for various uses can be completed. Among these, a chip-type solid electrolytic capacitor jacketed by resin mold is most preferred, in that reduction in the size and cost can be easily achieved.

With respect to the resin used for resin mold jacketing, a known resin used for encapsulation of a capacitor, such as epoxy resin, phenol resin and alkyd resin, can be employed. In all of these resins, when a low-stress resin generally available on the market is used, the encapsulation stress imposed on the capacitor element, which is generated at the time of encapsulation, can be mitigated and this is preferred. For encapsulation with resin, a transfer machine is used with preference. The direction of the inlet through which the resin is poured into a molding die placed in the transfer machine is selected arbitrarily by conducting preliminary experiments, so that the capacitor element may not be damaged.

The thus-produced solid electrolytic capacitor may be subjected to an aging treatment so as to repair the thermal and/or physical deterioration of the dielectric layer, which is caused at the time of formation of electrode layer or at the time of jacketing. The aging treatment is performed by applying a predetermined voltage (usually, within twice the rated voltage) to the capacitor. The optimal values of aging time and temperature vary depending on the type and capacitance of the capacitor and the rated voltage and therefore, these are previously determined by performing an experiment. The aging time is usually from several minutes to several days and the aging temperature is usually 300° C. or less by taking account of thermal deterioration of the voltage-applying jig. The aging atmosphere may be air or a gas such as argon, nitrogen and helium and the aging may be performed in any one condition of reduced pressure, atmospheric pressure and applied pressure. However, when the aging is performed in water vapor or performed after water vapor has been supplied, stabilization of the dielectric layer sometimes proceeds. One example of the method for supplying water vapor is a method of supplying water vapor from a water reservoir placed in the aging furnace by using heat.

The method of applying a voltage can be designed to pass an arbitrary current such as direct current, alternating current having an arbitrary waveform, alternating current superposed on direct current, and pulse current. The aging may be performed while raising a voltage from low voltage to high voltage in an arbitrary selected mode. It is also possible to once stop applying a voltage on the way of aging and again apply a voltage.

The solid electrolytic capacitor produced by the method of the present invention can be preferably used, for example, in a circuit using a high-capacitance and low-LC capacitor, such as central processing circuit and power source circuit. These circuits can be used in various digital devices such as a personal computer, server, camera, game machine, DVD equipment, AV equipment and cellular phone, and electronic devices such as various power sources. The solid electrolytic capacitor produced in the present invention has a high capacitance and a good LC performance can contributes to production of high-performance electronic circuits and electronic devices.

EXAMPLES

The present invention is described in greater detail below by specifically referring to Examples, but the present invention is not limited to these Examples. Incidentally, the surface area of a cathode plate during semiconductor layer formation used in the following Examples and Comparative Examples was measured by the BET method (using Vacprep 061, manufactured by Micromeritics Instrument Corporation).

Example 1

1. Placement of a Plurality of Electric Conductors to Metal Flame

As electric conductors, 640 units of tantalum sintered bodies (each having a size of 4.5×3.3×1 mm and a mass of 81 mg and a lead wire of 0.29 mmφ with 7 mm of the wire protruding from the surface of the conductor) of CV value 100,000 μF·V/g were used. In order to prevent solution from splashing up at the later step for forming a semiconductor layer, a tetrafluoroethylene-made washer was attached to the lead wire. The lead wires of 32 of the above sintered bodies were arrayed at even intervals and connected to a separately prepared stainless-steel long plate having a length of 250 mm, a width of 20 mm and a thickness of 2 mm, with each of the connection part of the lead wire being in the same size, while leaving 30 mm part in both longitudinal ends of the stainless-steel plate. 20 sheets of thus prepared metal long plate were aligned in parallel at intervals of 5 mm and were electrically connected to a metal frame each at a position 15 mm apart from both longitudinal ends of each plate. By the above operations, 640 sintered bodies were placed at even intervals in the metal frame so that each of the sintered bodies could be electrically connected through the lead wire to a power supply terminal provided at the metal frame.

2. Manufacture of Capacitor

The above metal frame was placed so that the sintered bodies and part of each of the lead wires were immersed in a chemical formation tank (whose four internal side surfaces and one internal bottom surface were covered with a tantalum plate) containing a separately-prepared aqueous 1% phosphoric acid solution. Chemical formation was performed by applying a voltage of 9 V at 80° C. for 8 hours, whereby a dielectric layer mainly comprising ditantalum pentoxide was formed on the surface of fine pores in the inside of each sintered body and the outer surface of the sintered bodies, and the surface of the part of each of the lead wires. The frame was pulled up from the chemical formation tank, washed with water and dried. Then, the series of operations of immersing the metal frame in an aqueous 20% iron toluenesulfonate solution/pulling out from the solution/drying at 105° C. for 15 minutes was repeated 5 times. Furthermore, the frame was disposed so that only the sintered bodies could be immersed in a tank for forming a semiconductor layer (five internal surfaces were covered with a platinum plate with platinum black, manufactured by ICHIMURA METAL CO. LTD, whose surface area measured by BET method was 50 times larger than its original surface area) containing water having 3,4-ethylenedioxythiophene (used as an aqueous solution in which the monomer concentration was a saturated concentration or lower) and anthraquinone-2-sulfonic acid dissolved therein and 20% ethylene glycol electrolytic solution. Then, a constant current of 25 mA was passed for 2 hours using the power supply terminal provided at the metal frame as an anode and using as a cathode the platinum plate with platinum black on the inner surface of the tank for forming a semiconductor layer. The metal frame was pulled up from the tank, washed with water and then with an alcohol and dried. Then, the metal frame was placed so that the sintered bodies and part of the lead wire of each of the sintered bodies could be immersed in the chemical formation tank described above and chemical reformation was performed (80° C., 7 V, 30 minutes) in order to mend minute defects leading to LC (leakage current) in the dielectric layer. After the frame was pulled up from the tank, washed with water and dried, the series of operations of the energization and the chemical reformation was repeated 12 times, followed by washing with water and then with an alcohol, and drying, whereby a semiconductor layer serving as a cathode was formed. Subsequently, only the sintered bodies were immersed in a carbon paste tank and then in a silver paste tank containing 10 parts by mass of acrylic resin and 90 parts by mass of silver powder, each immersion followed by drying, to thereby form an electrically conducting layer, whereby capacitor elements each having a cathode part provided thereon were produced. Then, the stainless-steel long plates were removed from the metal frame. On the upper surface of a pair of end parts of a separately-prepared copper alloy lead frame having a thickness of 100 μm having its surface applied with tin plating (and having 32 pairs of 3.4 mm-wide end parts with a distance of 1 mm between the end parts as a pair when projected on the same plane), the cathode part surface (the surface of 4.5×3.3 mm) and the lead wire a part of which wire had been cut off, of the capacitor elements, were placed and the cathode part of each element was electrically and mechanically connected by solidification of a silver paste of epoxy resin containing 75% of silver powder, and the lead wire by spot-welding. Thereafter, the entirety excluding a part of the lead flame was transfer-molded with epoxy resin to form an outer jacket and the lead frame outside the mold was cut at a predetermined position and the remaining frame outside the frame was bent along the outer jacket. In this way, 640 units of chip solid electrolytic capacitors of a size of 7.3×4.3×1.8 mm were produced. Subsequently, the capacitor was aged at 125° C. and 3.5 V for 2 hours and then left to stand at 185° C. for 30 minutes, thereby completing final capacitors each with a rated voltage of 2.5 V.

Example 2

640 units of solid electrolytic capacitors with a rated voltage of 2.5 V each were produced in the same manner as in Example 1 except that the platinum plate used for covering the five inner surfaces of the tank for forming a semiconductor layer was a platinum plate with platinum black (manufactured by ICHIMURA METAL CO. LTD.) having a surface area of 110 times larger than its original surface area as measured by BET method.

Example 3

640 units of solid electrolytic capacitors with a rated voltage of 2.5 V each were produced in the same manner as in Example 1 except that the platinum plate used for covering the five inner surfaces of the tank for forming a semiconductor layer was a platinum plate with platinum black (manufactured by ICHIMURA METAL CO. LTD.) having a surface area of 225 times larger than its original surface area as measured by BET method.

Comparative Example 1

640 units of solid electrolytic capacitors were produced in the same manner as in Example 1 except that the five inner surfaces of the tank for forming a semiconductor layer was covered with a tantalum plate serving as a cathode and that energization and chemical reformation were conducted 12 times.

Reference Example 1

640 units of solid electrolytic capacitors were produced in the same manner as in Example 1 except that the five inner surfaces of the tank for forming a semiconductor layer was covered with a tantalum plate serving as a cathode and that energization and chemical reformation were conducted 20 times.

Example 4

640 units of solid electrolytic capacitors with a rated voltage of 4 V each were produced in the same manner as in Example 1 except that niobium sintered bodies of CV 80,000 µF·V/g (having the size as those in Example 1 and of a mass of 54 mg) as electric conductors, that chemical formation was performed by applying a voltage of 20 V to form a dielectric layer comprising diniobium pentoxide, that the series of operations of energization and chemical reformation was repeated 22 times, that the energization was conducted at a constant current of 18 mA (34 mA for the last two times) in a tank for forming a semiconductor layer whose five inner surfaces were covered with a tantalum plate on which platinum black scraped off from the surface of the platinum plate as used in Example 3 was applied by using a silver paste to thereby make the surface area of the plate serving as a cathode 15 times larger than the projected surface area of the tantalum plate, and that the chemical reformation was conducted at 14V.

Example 5

640 units of solid electrolytic capacitors were produced by using niobium sintered bodies of CV 80,000 µF·V/g as electric conductors in the same manner as in Example 4 except that a tantalum plate covering the five inner surfaces of the tank was applied with platinum black by using a silver paste to thereby make the surface area of the plate 55 times larger than the original surface area of the tantalum plate.

Comparative Example 2

640 units of solid electrolytic capacitors were produced by using niobium sintered bodies of CV 80,000 µF·V/g as electric conductors in the same manner as in Example 4 except that a tantalum plate covering the five inner surfaces of the tank was applied with platinum black by using a silver paste to thereby make the surface area of the plate 5 times larger than the original surface area of the tantalum plate.

Comparative Example 3

640 units of solid electrolytic capacitors were produced in the same manner as in Example 4, except that the five inner surfaces of a tank for forming a semiconductor layer were covered with a tantalum plate and that the series of the operations of the energization and the chemical reformation was conducted 22 times.

Reference Example 2

640 units of solid electrolytic capacitors were produced in the same manner as in Example 4, except that the five inner surfaces of a tank for forming a semiconductor layer were covered with a tantalum plate and that the series of the operations of the energization and the chemical reformation was conducted 30 times to form a semiconductor layer.

Example 6

640 units of solid electrolytic capacitors were produced in the same manner as in Example 4, except that a stainless-steel tank having a length of 350 mm, a width of 170 mm and a height of 45 mm was used as a tank for forming a semiconductor layer and that the lead wires of 250 niobium sintered bodies prepared in the same manner as in Example 4 were connected to the four inner side surfaces and the inner bottom surface of the tank by welding to thereby make the surface area 35 times larger than the apparent surface area of the stainless steel surface.

[Measurements on Capacitance and LC Value of Solid Electrolytic Capacitor]

The Capacitances and LC values of the capacitors produced in Examples 1 to 6, Comparative Examples 1 to 3 and Reference Examples 1 and 2 were measured by the following methods.

Capacitance of Capacitor:

The capacitance was measured at room temperature and 120 Hz by using an LCR meter manufactured by Hewlett Packard, Ltd.

LC: The LC was measured at room temperature after applying a predetermined rated voltage (2.5 V for Examples 1 to 3, Comparative Example 1 and Reference Example 1, and 4 V for Examples 4 to 6, Comparative Examples 2 and 3, and Reference Example 2) between the terminals of each produced capacitor for 30 seconds.

The results are shown in Table 1.

TABLE 1

| | | Cathode plate | Capacitance *1 (µF) | LC *1 (µA) |
|---|---|---|---|---|
| Example | 1 | platinum plate with platinum black: 50 times larger than platinum surface area | 697 | 12 |
| | 2 | platinum plate with platinum black: 110 times larger than platinum surface area | 712 | 12 |
| | 3 | platinum plate with platinum black: 225 times larger than platinum surface area | 728 | 8 |
| | 4 | tantalum plate provided platinum black: 15 times larger than tantalum surface area | 149 | 25 |
| | 5 | tantalum plate provided platinum black: 55 times larger than tantalum surface area | 165 | 21 |
| | 6 | stainless-steel tank: 35 times larger than the apparent surface area in the inside of the tank | 166 | 18 |
| Com. Example | 1 | tantalum plate | 634 | 66 |
| | 2 | tantalum plate having platinum black attached thereto: 5 times larger than tantalum surface area | 150 | 45 |
| | 3 | tantalum plate | 142 | 79 |
| Ref. Example | 1 | tantalum plate | 693 | 13 |
| | 2 | tantalum plate | 155 | 22 |

*1 Average value of 550 capacitors having the smaller LC values than the LC values of the remaining 90 capacitors selected from the 640 capacitors produced in each Example.

As seen from Table 1, by comparison of Examples 1 to 3 with Comparative Example 1, it is shown that use of a platinum plate with platinum black as a cathode at the time of forming semiconductor layer reduces LC value of the produced capacitors. By comparison of Examples 4 to 6 with Comparative Example 2, it is shown that even in a case where a tantalum plate to which platinum black has been attached or a stainless-steel tank is used, if the surface area is larger by 10 times or more than its projected surface area, the same effect as in case of the platinum plate is used can be achieved.

In Reference Examples 1 and 2 using a same cathode as in Comparative Examples 1 and 2 respectively, the effect of lowering LC value was achieved by repeating energization and re-chemical formation more times than in Comparative Examples. However, such an approach is not preferred in that formation of semiconductor layer in this method requires more time than in Examples and that the produced semiconductor layer is thicker, which will result in failure to obtain a compact capacitor.

The invention claimed is:

1. A method of producing solid electrolytic capacitors, comprising sequentially stacking a dielectric oxide film, a semiconductor layer and an electrode layer on a sintered body of conductive powder to which an anode lead is connected and then encapsulating the sequential stack with an outer jacket resin, wherein the semiconductor layer is formed by electrolysis which comprises immersing the sintered body having the dielectric oxide film thereon in an electrolysis solution and applying current between the sintered body having the dielectric oxide film thereon and a cathode plate in contact with the electrolysis solution, the cathode plate being a cathode plate with its surface area having been made larger by 10 times or more than its apparent surface area,
    wherein said cathode plate comprises a wall of a container holding said electrolysis solution and used to form the semiconductor layer.

2. The method of producing solid electrolytic capacitors according to claim 1, wherein by connecting the sintered body of conductive powder to the cathode plate provided in a container holding said electrolysis solution and used to form the semiconductor layer or to a wall of the container, the surface area of the cathode is made larger by 10 times or more than the apparent surface area of the cathode.

3. The method of producing solid electrolytic capacitors according to claim 1, wherein the conductor is a metal or alloy consisting mainly of at least one selected from the group consisting of tantalum, niobium, titanium and aluminium, niobium oxide, or a mixture of two or more of these metals, alloys and niobium oxide.

4. The method of producing solid electrolytic capacitors according to claim 1, wherein the material of the anode lead is tantalum, aluminium, niobium and titanium or an alloy mainly containing these valve-action metals.

5. The method of producing solid electrolytic capacitors according to claim 1, wherein the anode lead is in form of line, foil or sheet.

6. The method of producing solid electrolytic capacitors according to claim 1, wherein the semiconductor layer is at least one selected from organic semiconductor layer and inorganic semiconductor layer.

7. The method of producing solid electrolytic capacitors according to claim 6, wherein the organic semiconductor is at least one selected from the group consisting of an organic semiconductor consisting of benzopyrroline tetramer and chloranile, an organic semiconductor mainly consisting of tetrathiotetracene, an organic semiconductor mainly consisting of tetracyanoquinodimethane and an organic semiconductor mainly consisting of an electroconductive polymer prepared by doping a dopant to a polymer having a repeating unit represented by formula (1) or (2)

[Chem. 1]

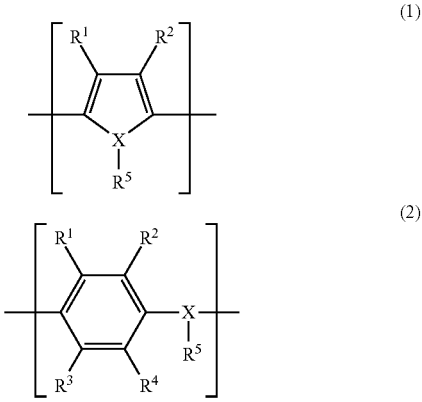

(In the formula, $R^1$ to $R^4$ each independently represents a hydrogen atom, an alkyl group having 1 to 6 carbon atoms or an alkoxy group having 1 to 6 carbon atoms, X represents an oxygen atom, a sulfur atom or a nitrogen atom, $R^5$, which is present only when X is a nitrogen atom, represents a hydrogen atom or an alkyl group having 1 to 6 carbon atoms, and $R^1$ with $R^2$ or $R^3$ with $R^4$ may combine with each other to form a ring).

8. The method of producing solid electrolytic capacitors according to claim 7, wherein the electroconductive polymer having the repeating unit represented by formula (1) is an electroconductive polymer having as repeating unit a structural unit represented by formula (3)

[Chem. 2]

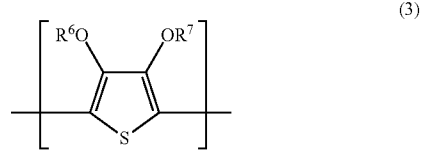

(In the formula, $R^6$ and $R^7$ each independently represents a hydrogen atom, a linear or branched, saturated or unsaturated alkyl group having 1 to 6 carbon atoms, or a substituent forming at least one 5- to 7-membered saturated hydrocarbon ring structure containing two oxygen atoms, in which said alkyl groups are bonded at arbitrary positions with each other. Also, examples of the ring structure include those having a vinylene or phenylene bond which may be substituted).

9. The method of producing solid electrolytic capacitors according to claim 7, wherein the electroconductive polymer is selected from polyaniline, polyoxyphenylene, polyphenylene sulfide, polythiophene, polyfuran, polypyrrole, polymethylpyrrole, and substituted derivatives thereof and copolymers thereof.

10. The method of producing solid electrolytic capacitors according to claim 8, wherein the electroconductive polymer is poly(3,4-ethylenedioxythiophene).

11. The method of producing solid electrolytic capacitors according to claim 6, wherein the electroconductivity of the semiconductor is within a range of $10^{-2}$ to $10^3$ S/cm.

12. A solid electrolytic capacitor produced by the method described in claim 1.

13. An electronic circuit using the solid electrolytic capacitor described in claim 12.

14. An electronic device using the solid electrolytic capacitor described in claim 12.

15. The production method of the solid electrolytic capacitor as claimed in claim 1 wherein the cathode is a sintered body of conductive powder.

* * * * *